July 20, 1971  R. D. MARGESSON ET AL  3,594,142
PROCESSES FOR THE PELLETIZATION OF METALLURGICAL SLAG
Filed June 5, 1968

INVENTOR.
RICHARD D. MARGESSON
WILLIAM G ENGLAND
BY Church & Rogers.
PATENT AGENTS

United States Patent Office 3,594,142
Patented July 20, 1971

3,594,142
PROCESSES FOR THE PELLETIZATION OF METALLURGICAL SLAG
Richard D. Margesson, Burlington, Ontario, and William G. England, Grimsby, Ontario, Canada, assignors to National Slag Limited, Hamilton, Ontario, Canada
Filed June 5, 1968, Ser. No. 734,723
Int. Cl. C03b 5/18
U.S. Cl. 65—19          7 Claims

ABSTRACT OF THE DISCLOSURE

In a process for the production of generally-spherical pellets from blast furnace slag a stream of molten slag is mixed with water to initiate its foaming and/or expansion; the slag and water mixture flows over the surface of a cooled plate and is then projected into the air by a projecting device such as a rotating drum provided with radially-extending concave vanes; the motion of the expaned pyroplastic slag in the air causes it to form spherical pellets that are sufficiently cooled to retain their individual identities upon reaching the ground.

FIELD OF THE INVENTION

The present invention is concerned with processes and apparatus for the pelletization of metallurgical slag, and especially to such processes and apparatus capable of producing generally-spherical, closed-surface pellets from such slag.

DESCRIPTION OF THE PRIOR ART

The handling and disposal of the large quantities of blast furnace slag that results from iron production is a continuing problem, and much research has been carried out into methods of converting the slags into commercially usable forms. In one process that has been extensively used hitherto the slag is quenched rapidly by dumping it into large quantities of water in an open pit. The cooled material that results is of random size, from powder to large lumps, and generally is of porous, brittle nature. The cooled slag removed from the pit is subjected to a series of sieving and grinding operations, whereby it is sorted into different, uniform particle sizes. The resulting products may be used for different purposes, depending largely upon the particle size, for example, as an aggregate for concrete or as a constituent of concrete blocks.

Processes of this type have the disadvantage that the rapid quenching tends to cause the production of substantial quantities of gaseous by-products which escape into the atmosphere. Moreover, the products are not of optimum quality for use as aggregate or filling materials with cement in view of their relatively low strength and highly porous nature.

SUMMARY OF THE INVENTION

It is an object of the present invention to provide new processes for the pelletization of blast furnace metallurgical slag.

It is another and important object to provide processes for the pelletization of metallurgical slag whereby the production of undesired gaseous emissions is very substantially reduced.

In accordance with the present invention there is provided a process for the pelletization of metallurgical slag to produce therefrom generally spherical pellets of slag material in expanded form, the process including the steps of:

(a) Forming a stream of molten liquid slag of controlled rate of flow.

(b) Mixing the said stream with a controlled quantity of water to at least initiate a slag expanding interaction thereof.

(c) Said controlled rates of slag and water flow being correlated to be just sufficient to plasticize and expand the slag to a pyroplastic state of a viscosity proper for spherulization thereof upon projection through the air and during its solidification while in the air.

(d) Flowing the interacting mixture of slag and water over a surface to enable the said interaction to proceed until the material is in the said pyroplastic state and of said viscosity.

(e) And thereafter impinging the material in said pyroplastic state on a rotating mechanical projecting device and thereby projecting the material through the air at a speed and for a distance sufficient for the generally spherical pellets formed thereby to be sufficiently cooled to be self-sustaining and to retain their individual identities upon reaching the ground.

Preferably, the mixture of slag and water flows over a downwardly inclined surface in its passage from the said common zone to the said projecting means, and the projecting means may comprise a motor-driven rotary drum having radially extending throwing vanes, the drum being mounted for rotation about an axis such that the mixture moves radially relative to the axis onto the periphery of the drum; the said radially extending vanes may be approximately concave in their direction of motion.

DESCRIPTION OF THE DRAWINGS

Embodiments of the invention will now be described, by way of example, with reference to the accompanying drawings, wherein.

DESCRIPTION OF THE PREFERRED EMBODIMENTS

Figure 1:
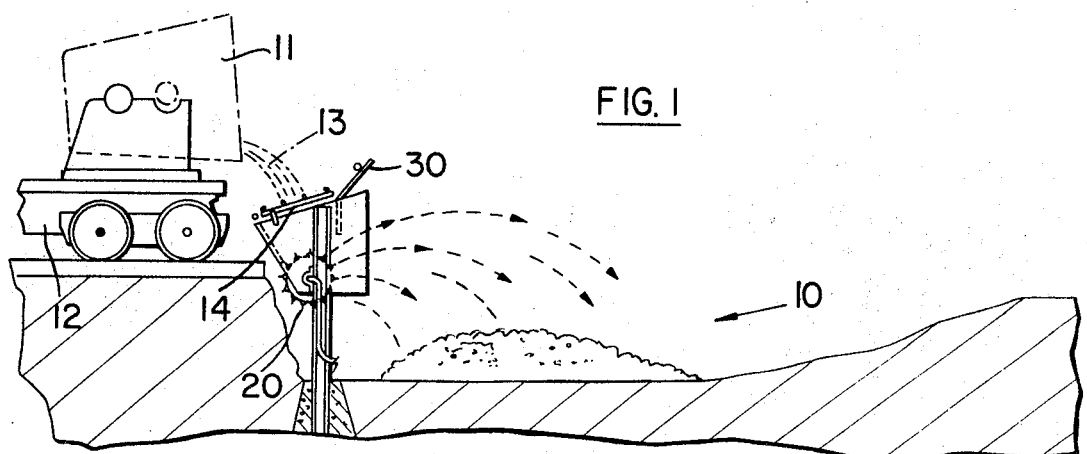
FIG. 1 is a plane side section to illustrate in a general manner the apparatus and the process employing such apparatus.
Figure 2:
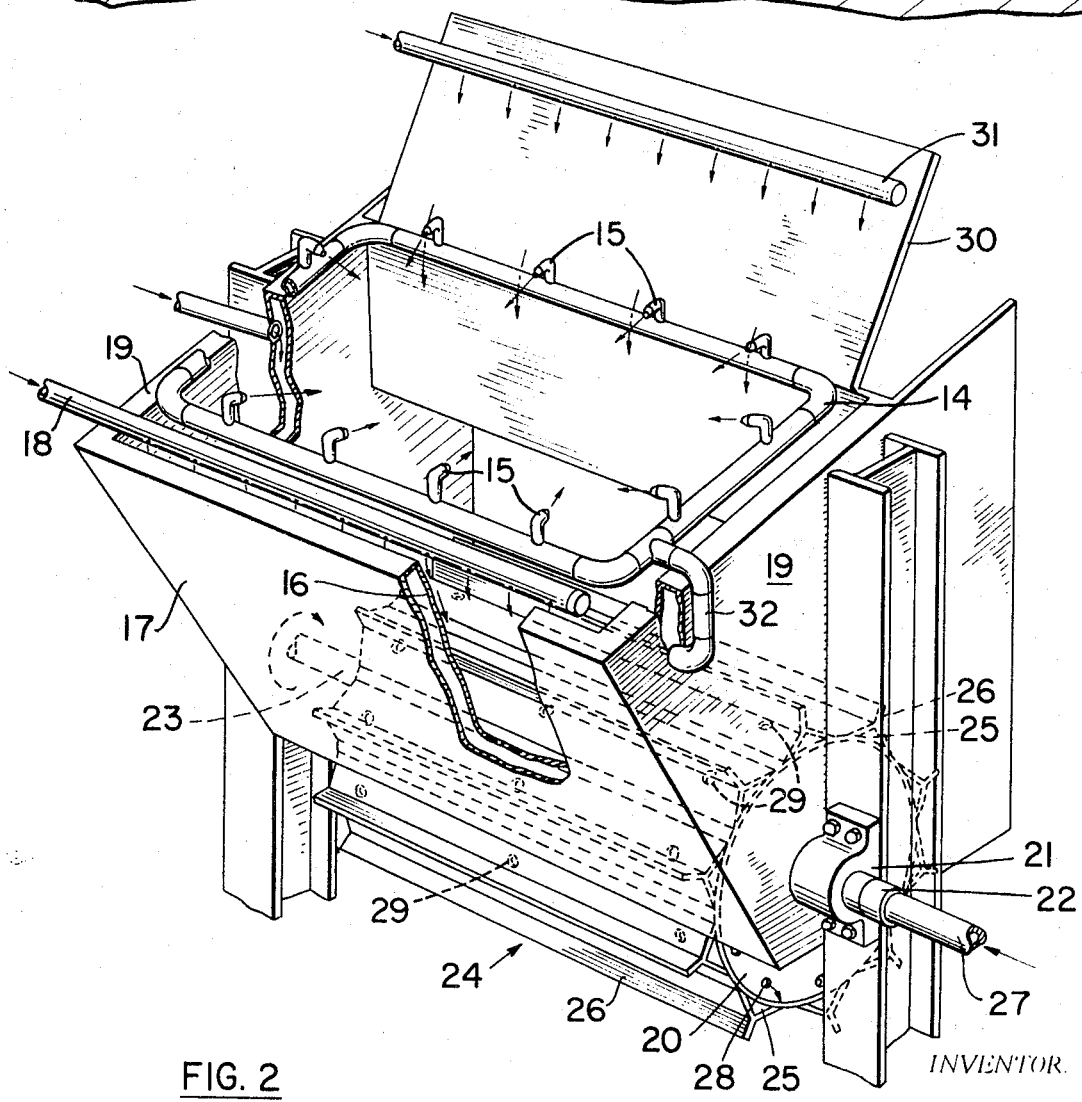
FIG. 2 is a general perspective view from above and to one side showing the apparatus to a larger scale and in greater detail.

Referring especially to FIG. 1 in this particular embodiment the process is carried out over a pit indicated generally by the reference 10, the slag being brought to the edge of the pit in a conventional ladle 11, mounted in any suitable manner on vehicle 12 for controlled pouring by an operator, the said pouring being controlled to produce a stream 13 of slag that is as constant as possible in flow volume from start to finish of the operation. Care must be taken before commencing the operation to ensure that any surface crust on the ladle contents is broken up, so as to prevent a sudden rush of slag on breaking of this crust, and also to prevent the feeding of large lumps of solid slag to the apparatus.

The stream 13 passes vertically downwards through a generally ring-shaped water supply pipe 14 that mounts and feeds a plurality of inwardly-directed nozzles 15 projecting respective streams of water toward a common central zone through which the slag stream 13 passes. The number and disposition of the jets are such that the resulting and/or adherence of the slag, and to direct the slag common zone and the slag stream is not deflected out of its vertical path.

The water streams mix and interact with the slag and, at the very high temperature of the slag (usually 2500–2700° F.) begin to vaporize and commence its expansion and/or disintegration and cooling. The mixture of slag and water impinges on a downwardly inclined surface 16 constituted by the upper plate of a hollow water-cooled enclosure 17, and flows downward over the plate. A feed pipe 18 is disposed at the top edge of the surface 16 and discharges water through a plurality of spaced apertures onto the surface, this additional water flowing downward with the slag and water mixture and mixing therewith in its downward passage.

Two parallel water-cooled structures 19 are provided on either side of the surface 16 to prevent sideways splashing and/or adherence of the slage, and to direct the slag toward a motor-driven rotary drum 20, which is mounted by bearings 21 with the axis of rotation of its axle 22 horizontal and therefore generally transverse to the downward direction of motion of the slag. The motor for driving the drum, which preferably is of variable-speed type, is not shown herein but is located at a considerable distance to one side of the apparatus to avoid the possible deleterious effects of temperature, humidity and slag splashes, the motor being connected to the drum axle 22 by an elongated drive shaft 23.

The periphery of the drum is provided with radially-extending flinging or projecting vanes indicated generally by 24, which engage the downwardly-moving slag and water mixture and fling the material through the air over and into the pit. In this embodiment these vanes 24 are constituted by right-angle members 25 welded at their longitudinal edges to the drum periphery parallel to its axis, and having radially-extending members 26 welded to their apices, with the result that the vanes have an approximately concave shape in their direction of movement, thereby increasing their efficiency and their control of the direction in which the material is projected. The interior of the drum is supplied with cold water via pipe 27, so as to prevent over-heating by transfer from the molten slag, the water escaping from the drum interior through openings 28. In addition, flow passages 29 are provided from the interior of the drum to the underside of the angle members 25, so that the vanes also are cooled as much as possible.

An upper deflectable member 30 is provided above the drum to control and limit the upward angle at which material can be projected from the periphery of the drum, this plate being cooled by streams of water that are fed to the upper surface thereof from a suitable feed pipe 31 mounted at its upper edge. In this embodiment the cooling water supplied to the enclosures 17 and 19 subsequently is supplied to the pipe 14 via a connection 32 and used in the process, thereby avoiding the need for a separate discharge.

In the operation of a process in accordance with the invention the ladle 11 that has been filled with molten slag from the blast furnace preferably is moved as quickly as possible to the pelletizing apparatus, so as to avoid or reduce the formation of a cooled crust on the slag surface. As described above, the ladle is operated so as to pour as uniform a stream of slag as possible through the apparatus, while the rate of feed of water to the apparatus is maintained reasonably constant (e.g. by means of an adjacent header tank), thereby producing operating conditions that are as constant as possible. As the slag stream passes through the said common zone of the nozzles 15 it is mixed with the jets of water therefrom and thereafter flows over the surface 16. Because of the high temperature of the slag there is an immediate volatile reaction as the water and the slag mix, with the result that the slag is expanded and is in a desired pyroplastic state of a viscosity proper for spherulization by the time that it contacts the periphery of the rotating drum.

The rate of flow of the slag stream, the quantity of water fed into the slag stream, the peripheral speed of the drum, the shape of the flinging vanes 24, and the angle at which the mixture is projected from the drum are all controlled so as to cause the slag to remain in the air for a time and distance sufficient to cool it, and to form it into generally-spherical, self-sustaining pellets that will retain their individual identities upon reaching the ground.

It will be understood that if insufficient water is supplied to the slag stream, or if insufficient mixing takes place, then the reaction of the components and cooling of the stream will not be sufficiently advanced to the desired pyroplastic state by the time that it engages the rotating drum, and liquid or semi-liquid slag will be thrown into the air and will land on the material in the pit, wherein it will cause coalescing of any particles that have been produced, besides itself being a relatively undesirable product. Similarly, if too much water is fed into the stream, then the slag will be overcooled resulting in a weakened internal structure of the slag particles.

If the speed of the drum is not sufficient then again the material is not in the air a sufficient time to assume a generally spherical form and/or to cool down sufficiently to prevent coalescing thereof with the other material in the pit when it lands thereon. At speeds which are too high for the process described herein smaller than average pellets will result.

In a particular preferred example, the ladle 11 a capacity of about 25 tons and the slag, which is derived from a basic iron process, is poured at a rate of from about ¾ to about 1½ tons per minute. Water is fed to the nozzles 15 at from about 150 to about 250 gallons per minute, while the drum is rotated at a speed so as to give a peripheral speed at the tips of the vanes of from about 40 to about 55 feet per second.

It has been found that by employment of a process in accordance with the invention at least approximately 70% of the total weight of the slag that is poured through the apparatus is converted to the form of generally-spherical pellets having a range in diameter of from about .4 inch to about .06 inch, with the majority having a diameter of about .25 inch. Moreover, it is found that the particles produced tend to have a closed or smooth relatively non-porous surface with a more porous core, such that there is a greatly reduced tendency, as compared with slag aggregates of the prior processes, to absorb cement when used as an aggregate in a cement mixture. For example, in a prior product produced by the direct quenching of the slag 3,000 pounds of slag aggregate was employed with 600 pounds of cement for production of a suitable coherent concrete material, meeting current strength requirements, whereas a pelletized slag product in accordance with the present invention resulted in concrete material suitable for the same purpose having approximately 50% higher strength.

Other desirable features of concrete produced using our new material are increased workability and green strength, combined with lower water absorption of the cured product.

Although in the process particularly described above the slag stream is described as being produced by controlled tilting, it can also be produced by tapping through an orifice built into the side of the ladle, such tapping avoiding the problems caused by the top crust. Other ways of obtaining uniform flow are, for example, by pouring through a notch built into the ladle rim, or by pouring through an orifice provided in a plate mounted at the top of the ladle.

It is found that the quantity of water required for the required expansion varies considerably with the chemical constitution of the slag, and for example a silicious slag may require considerably less water for foaming than the basic slag referred to herein.

It is a special advantage of our invention that the volume of gaseous emissions released from the slag is very considerably reduced over the known pit processes for expanding slag, to the extent that such emissions are no longer a significant pollution problem.

Although particular processes and apparatus have been described herein, it will be apparent to those skilled in the art that various changes and modifications can be made in specific details thereof, within the scope of the appended claims.

What we claim is:

1. A process for the pelletization of metallurgical slag to produce therefrom generally spherical pellets of slag material in expanded form, the process including the steps of:
   (a) forming a stream of molten liquid slag of controlled rate of flow,
   (b) mixing the said stream with a controlled quality of water to at least initiate a slag expanding interaction thereof,
   (c) said controlled rates of slag and water flow being correlated to be just sufficient to plasticize and expand the slag to a pyroplastic state of a viscosity proper for spherulization thereof upon projection through the air and during its solidification while in the air,
   (d) flowing the interacting mixture of slag and water over a surface to enable the said interaction to proceed until the material is in the said pyroplastic state and of said viscosity,
   (e) and thereafter impinging the material in said pyroplastic state on a rotating mechanical projecting device and thereby projecting the material through the air at a speed and for a distance sufficient for the generally spherical pellets formed thereby to be sufficiently cooled to be self-sustaining and to retain their individual identities upon reaching the ground.

2. A process as claimed in claim 1, including the step of producing the said slag stream by pouring, and mixing the slag stream with water by directing a plurality of streams of water inwardly toward a common zone through which the slag stream passes in a direction transverse to the directions of the water streams.

3. A process as claimed in claim 1, wherein the said surface is part of a water-cooled enclosure.

4. A process as claimed in claim 1, wherein the said pyroplastic slag material is projected through the air by its engagement with the external periphery of a motor-driven rotary drum having radially-extending throwing vanes, the direction of movement of the mixture onto the periphery of the drum being generally radial with respect to the drum axis.

5. A process as claimed in claim 1, and including the step of producing the said slag stream as a freely-downwardly-falling stream by pouring from a ladle.

6. A process as claimed in claim 1, wherein the rate of flow of the slag in the said stream thereof is from ¾ to 1½ tons per minute, while the rate of flow of water is from 150 to 250 gallons per minute.

7. A process as claimed in claim 4, wherein the drum is rotated to have a peripheral speed of from 45 to 55 feet per second.

References Cited
UNITED STATES PATENTS

| | | | |
|---|---|---|---|
| 56,595 | 7/1866 | Morris | 65—19 |
| 1,047,370 | 12/1912 | Bergquist | 65—19 |
| 3,310,391 | 3/1967 | Law | 65—142 |

S. LEON BASHORE, Primary Examiner

R. L. LINDSAY, JR., Assistant Examiner

U.S. Cl. X.R.

65—20, 21, 141

UNITED STATES PATENT OFFICE
CERTIFICATE OF CORRECTION

Patent No. 3,594,142          Dated July 20, 1971

Inventor(s) Richard D. Margesson and William G. England

It is certified that error appears in the above-identified patent and that said Letters Patent are hereby corrected as shown below:

Column 2, line 63 Alter to read:

"ing water streams tend to oppose one another in the said"

Column 3, line 12: Alter "slage" to - slag -

Signed and sealed this 7th day of December 1971.

(SEAL)
Attest:

EDWARD M. FLETCHER, JR.      ROBERT GOTTSCHALK
Attesting Officer             Acting Commissioner of Patents